A. V. ROE.
DETACHABLE AND ADJUSTABLE SEAT FOR AUTOMOBILES AND OTHER VEHICLES.
APPLICATION FILED MAR. 16, 1920.
1,362,041.
Patented Dec. 14, 1920.
2 SHEETS—SHEET 1.
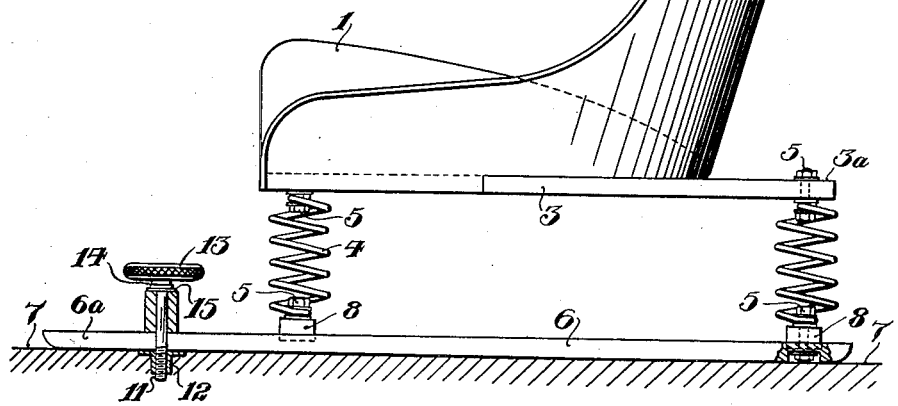
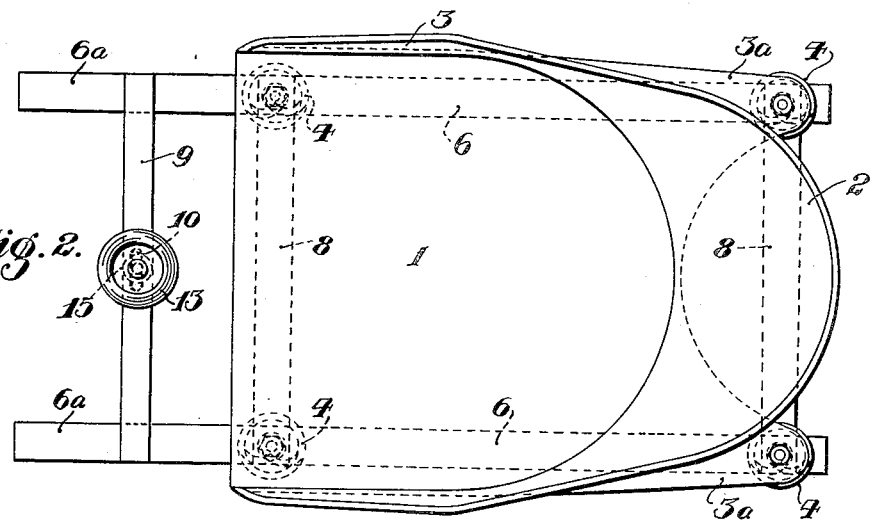
A. V. ROE.
Inventor.
per Geo. A. Hutchinson
Attorney.

A. V. ROE.
DETACHABLE AND ADJUSTABLE SEAT FOR AUTOMOBILES AND OTHER VEHICLES.
APPLICATION FILED MAR. 16, 1920.

1,362,041.

Patented Dec. 14, 1920.

A. V. ROE.
Inventor,
per:- Geo. A. Hutchinson
Attorney.

UNITED STATES PATENT OFFICE.

ALLIOTT VERDON ROE, OF BURSLEDON, ENGLAND, ASSIGNOR TO A. V. ROE & CO., LIMITED, OF MANCHESTER, ENGLAND.

DETACHABLE AND ADJUSTABLE SEAT FOR AUTOMOBILES AND OTHER VEHICLES.

1,362,041. Specification of Letters Patent. Patented Dec. 14, 1920.

Application filed March 16, 1920. Serial No. 366,280.

*To all whom it may concern:*

Be it known that I, ALLIOTT VERDON ROE, a subject of the King of Great Britain, residing at Bursledon, Hampshire, England, have invented certain new and useful Improvements in and Relating to Detachable and Adjustable Seats for Automobiles and Other Vehicles, of which the following is a specification.

This invention relates to the detachable and adjustable seats for automobiles and other vehicles and has for its object to provide a detachable and adjustable seat structure having a new or improved means of attachment to the vehicle floor, or the like, whereby the said structure is rendered readily adjustable, longitudinally, laterally and angularly about its anchorage in any and every direction parallel to the floor surface.

In accordance with my invention, each seat is mounted preferably through the medium of springs or other shock absorbers—upon a base frame, adapted to rest upon the floor of the vehicle. This base frame has a conveniently disposed extension or extensions also resting upon the floor and forming a fork between the arms of which passes a securing bolt or the like which coöperates with a loose bridge piece to fix said frame to the floor. This bolt is provided with a handwheel, whereby it may conveniently be actuated and, in operation, it passes through a hole or slot in the bridge piece, which rests transversely across both arms of the fork aforesaid: it also passes between said arms and removably engages a suitable bush, which is set in the floor with its upper surface flush, or substantially flush, with the floor surface. The securing bolt and the bridge piece aforesaid function to clamp the base frame of the seat to the floor of the vehicle, the clamping action being most conveniently effected, by screwing the bolt into the floor bush aforesaid until a suitable collar provided at the head of the said bolt bears firmly upon the upper face of said bridge piece.

In general, I find it preferable to locate the forked extension in front of the seat, since, by this arrangement the clamp actuating means is brought within easy reach of the occupant and the seat held against movement tended to be imparted by the abnormal forces resulting from rapid acceleration or deceleration of the vehicle. I may, however, dispose the extension and screw at the rear or side of the seat if such arrangement be for any reason desirable.

For the dual purpose of protecting the occupant of the seat from road (or other) shocks and of preventing such shocks from reacting injuriously upon the base frame and clamping means, the seat proper may be supported above the base frame upon springs or elastic shock absorbers. In practice I prefer to mount ordinary helical springs upon the base frame and to superimpose the seat bottom directly upon the upper extremities of the said springs.

Now in order that my invention may more readily be understood and carried into practice, reference is hereinafter made to the accompanying sheets of illustrative drawings which show preferred embodiments thereof In these drawings:—

Figure 1 is a side elevational view of a seat of the so called "bucket" type supported upon an adjustable base frame in accordance with my invention.

Fig. 2 is a plan view and

Figure 3:
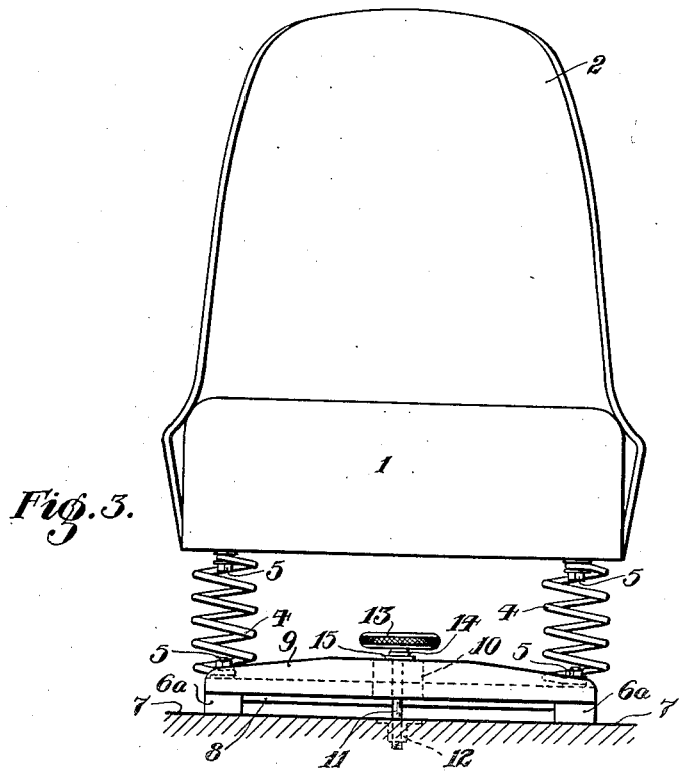
Figure 4:
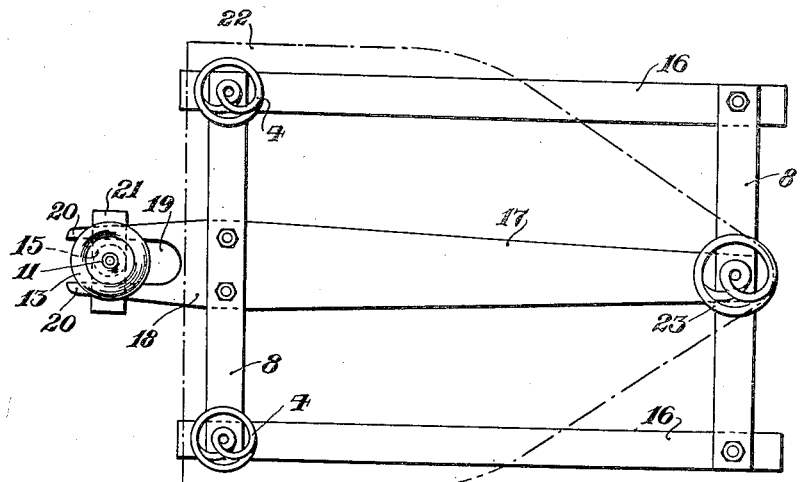

Fig. 3 a front elevational view of the seat and supporting means therefor illustrated in Fig. 1, while Fig. 4 is a plan view of a modified form of base frame, with the seat removed therefrom for purposes of clearer illustration, the position of the rigid seat bottom being indicated in dot and dash line.

Referring to these drawings and, more particularly to Figs. 1 to 3 thereof; the numeral 1 designates a seat having a "bucket" type back 2 and a rigid bottom 3 resting upon the upper extremities of a plurality of springs 4 which connect it to the adjustable base frame hereinafter to be described.

Two such springs 4 located immediately beneath the front edge of the seat may operate in conjunction with two similar springs located beneath rearward extensions 3ª of the seat bottom 3, said springs being attached to the said seat bottom and to the adjustable base frame by bolts 5. It will be understood that the helical springs and the disposition thereof as illustrated in the accompanying drawings are shown merely by way of example and that I may substitute suitably disposed leaf springs, rubber buffers or other equivalent resilient means without departing from the spirit of my present invention.

The base frame, as illustrated in Figs. 1 to 3 of the drawings, comprises a pair of longitudinal runners 6 resting upon the floor 7 and spaced apart by means of cross pieces, or battens 8, said longitudinal runners being extended forwardly of the foremost batten 8 so that the two extensions 6ᵃ form, in conjunction with said batten, a fork structure, which provides for the attachment of said base frame to the floor.

The attaching means proper comprises a bridge-piece 9 whose extremities bear upon the extensions 6ᵃ of the runners 6 aforesaid and which has a centrally, or substantially centrally, disposed slot 10 through which passes a fixing bolt 11 adapted to screw into a bush 12 countersunk into the floor 7. This bolt 11 has an enlarged head, or handwheel 13 by which it may be grasped and rotated and a boss 14 bearing upon a collar 15 which, in turn, bears upon the bridge piece 9. The operation of the bolt 11 to clamp the extensions 6ᵃ firmly between the bridge piece 9 and the floor 7 will readily be apparent. Fore and aft adjustment of the seat is provided for by the surplus length of the extensions 6ᵃ, lateral adjustment by the presence of the slot 10 in the bridge-piece 9, and angular adjustment by the fact that I employ only one fixing bolt which may thus function as a pivot about which the whole seat can turn when the clamping action is removed.

The modified form of base frame illustrated in Fig. 4 of the drawings comprises a pair of longitudinal runners 16 spaced apart by battens 8, as in the previous example, but in this construction the said runners are not extended appreciably in front of the foremost batten, since they are not intended to be utilized in securing the base frame to the floor. Instead of extending the runners 16 I provide a third longitudinal member 17, secured beneath the battens 8, and preferably located midway between the said runners. This member 17 has a portion 18 extending forwardly of the foremost batten 8 and provided with a slot 19, so as to constitute a fork, across the arms 20 of which rests the bridge piece 21. As in the previous example, a bolt 11, engaging a threaded bush countersunk into the floor serves to clamp the fork between the floor and the bridge piece 21. It will be observed that the slot 19 is sufficiently wide and sufficiently deep, in relation to the diameter of the bolt 11, to permit of considerable longitudinal and lateral adjustment of the base frame, while angular adjustment thereof is attained in the manner hereinbefore described.

In Fig. 4 the resilient connection between the base frame and the rigid seat bottom 22 is comprised in a pair of coil springs 4 located immediately beneath the front edge of the seat and a single, but stronger coil spring 23 mounted above the center of the rear batten 8.

It will readily be appreciated that the above described arrangements permit the seat to be adjusted (in a horizontal plane) both laterally and longitudinally, as well as angularly in relation to the body of the vehicle or to be removed altogether, and when it is removed the clamping members may also be removed so that no projecting obstructions remain upon the floor.

I claim:—

1. A support for a detachable and adjustable seat unit comprising a base adapted to rest upon a floor structure, a pair of arms formed thereon and adapted to lie evenly on said floor structure, a loose bridge piece disposed transversely across said arm members, means operative to clamp said arm members between said floor structure and said loose bridge piece, and supporting means for said seat connecting the seat to said base.

2. A support for a detachable and adjustable seat unit comprising a base adapted to rest upon a floor structure, a fork device protruding from said base, a loose bridge piece adapted to lie across the arms of said fork, a fitting in said floor structure, means coöperating with said fitting to clamp the arm members between the floor structure and said loose bridge piece and supporting means for said seat connecting the seat to said base.

3. A detachable and adjustable seat unit, comprising a rectangular base frame, having longitudinal extensions of its side, in a forward direction, a loose bridge piece disposed transversely of the said extensions, a threaded bolt member projected through said loose bridge piece, an internally threaded fitting in a supporting surface, to receive one end of said bolt member, a seat having base extensions in a rearward direction, a helical coil spring, connecting each said seat base rear extension to a respective rear corner of the rectangular portion of the base frame, and a helical coil spring connecting each forward corner of the said rectangular portion of the base frame to its respective portion in the forward parts of said seat.

4. A support for a detachable and adjustable seat unit, comprising a base adapted to rest upon a floor structure, a pair of arms formed thereon and adapted to lie evenly on said floor structure, a loose bridge piece containing a central slot for lateral adjustment of the seat unit, means projected through said slot operative to clamp said arm members between said floor structure and said loose bridge piece, and resilient supporting means connecting the seat to said base.

5. A detachable and adjustable seat unit comprising a base frame of rectangular form, protruding arms formed thereon adapted to lie with the base frame evenly on a floor structure, a loose bridge piece disposed transversely of said arm members, and containing a central slot for lateral adjustment of said seat unit, a threaded bolt member projected through said loose bridge piece, an internally threaded fitting in said floor structure to receive said bolt member, a helical spring for supporting said seat at each corner of the rectangular base frame, and a seat connected, for support, to said springs.

6. A detachable and adjustable seat unit comprising a base frame of rectangular form, a centrally disposed longitudinal member fixed thereto and having a forked extremity protruding from said base frame and adapted to lie evenly on a floor structure, a loose bridge piece disposed transversely of the arms of said fork member, and containing a central slot for lateral adjustment of said seat unit, a threaded bolt member projected through said loose bridge piece, an internally threaded fitting in said floor structure to receive said bolt member, a helical spring for supporting said seat at each corner of the rectangular base frame, and a seat connected, for support, to said springs.

In testimony whereof I affix my signature.

ALLIOTT VERDON ROE.